United States Patent
Hochi

(10) Patent No.: US 7,351,761 B2
(45) Date of Patent: Apr. 1, 2008

(54) RUBBER COMPOSITION AND TIRE USING THE SAME

(75) Inventor: Kazuo Hochi, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 0 days.

(21) Appl. No.: 11/645,506

(22) Filed: Dec. 27, 2006

(65) Prior Publication Data

US 2007/0149688 A1    Jun. 28, 2007

(30) Foreign Application Priority Data

Dec. 28, 2005    (JP) .............................. 2005-379009

(51) Int. Cl.
    *C08K 3/34*    (2006.01)
(52) U.S. Cl. ....................... 524/442; 524/426; 524/427
(58) Field of Classification Search ................ 524/442, 524/426, 427
    See application file for complete search history.

(56) References Cited

U.S. PATENT DOCUMENTS 6,759,456 B2 *  7/2004  Kikuchi ....................... 524/81

FOREIGN PATENT DOCUMENTS

| JP | 05-132583 | * | 5/1993 |
| JP | 5-132583 A | | 5/1993 |
| JP | 8-269243 A | | 10/1996 |
| JP | 11-209519 A | | 8/1999 |
| JP | 2001-172434 | * | 6/2001 |
| JP | 2001-172434 A | | 6/2001 |

* cited by examiner

*Primary Examiner*—Ling-Sui Choi
(74) *Attorney, Agent, or Firm*—Birch, Stewart, Kolasch & Birch, LLP

(57) ABSTRACT

A rubber composition and a tire made therefrom in which rolling resistance can be reduced without lowering wet grip performance, wherein the rubber composition contains a rubber component and 15 to 150 parts by weight of silica having a nitrogen adsorbing-specific surface area of 20 to 500 $m^2/g$, on the basis of 100 parts by weight of the rubber component, and wherein the rubber component includes not less than 15% by weight of a styrene-butadiene rubber (1) containing a styrene amount of not less than 33% by weight and a vinyl amount of not less than 30% by weight, and not less than 10% by weight of a styrene-butadiene rubber (2) containing a styrene amount of not more than 15% by weight and a vinyl amount of not more than 60% by weight, wherein a total amount of the styrene-butadiene rubber (1) and the styrene-butadiene rubber (2) is not less than 60% by weight.

7 Claims, No Drawings

RUBBER COMPOSITION AND TIRE USING THE SAME

BACKGROUND OF THE INVENTION

The present invention relates to a rubber composition and a tire using the rubber composition.

In recent years, grip performance and rolling resistance property are required to be improved in a tread as properties necessary for a tire. Both grip performance and rolling resistance property relate to hysteresis loss of a rubber. Generally, if hysteresis loss is large, grip force is large and braking performance is improved, thus, grip performance is excellent, but deterioration of rolling resistance property is caused since rolling resistance becomes large. As described above, since grip performance and rolling resistance property are in an antithetic relation, various rubber compositions for a tire have been proposed so as to satisfy both properties at the same time.

In order to improve both grip performance and rolling resistance property together, a rubber composition compounded with silica as a reinforcing agent, in which grip performance and rolling resistance property are improved in favorable balance, is known. However, the rubber composition has a problem that improvement effects of both grip performance and rolling resistance property are not sufficient.

As a process of further lowering rolling resistance, a method of compounding silica and a silane coupling agent is also known. Rolling resistance can be lowered by chemically bonding a rubber and silica with a silane coupling agent due to compounding the silane coupling agent. However, when the silica and silane coupling agent are kneaded, it is necessary to sufficiently react at a high temperature, and a functional group in the silane coupling agent reacting with a rubber initiates a reaction during processing such as kneading, which causes a problem that a phenomenon of rubber scorch called gelation occurs.

JP-A-2001-172434 discloses a rubber composition for a tread showing excellent wet grip performance under a high temperature and comprising specified amounts of a rubber component containing a specified amount of a specific solution-polymerized styrene-butadiene rubber, a silica and a specific aromatic oil, however, rolling resistance is not lowered in the rubber composition for a tread.

SUMMARY OF THE INVENTION

An object of the present invention is to provide a rubber composition, in which rolling resistance can be reduced without lowering wet grip performance, and a tire using the rubber composition.

The present invention relates to a rubber composition comprising 15 to 150 parts by weight of silica having a nitrogen adsorbing-specific surface area of 20 to 500 $m^2/g$, on the basis of 100 parts by weight of a rubber component comprising not less than 15% by weight of a styrene butadiene rubber (1) having a styrene content of not less than 33% by weight and a vinyl content of not less than 30% by weight, and not less than 10% by weight of a styrene-butadiene rubber (2) having a styrene content of not more than 15% by weight and a vinyl content of not more than 60% by weight, wherein a total content of the styrene-butadiene rubber (1) and the styrene-butadiene rubber (2) is not less than 60% by weight.

It is preferable that when the silica is dispersed in water to be a 5%-aqueous dispersion, a pH of the aqueous dispersion of the silica is 7 to 12.

The present invention further relates to a tire, which comprises the rubber composition.

DETAILED DESCRIPTION

The rubber composition of the present invention comprises a rubber component and a silica.

The rubber component comprises a styrene-butadiene rubber (1) (SBR (1)) and a styrene-butadiene rubber (2) (SBR (2)).

A styrene content in SBR (1) is not less than 33% by weight, and preferably not less than 35% by weight. When the styrene content in SBR (1) is less than 33% by weight, grip performance is not sufficiently improved. The styrene content in SBR (1) is preferably not more than 50% by weight, and more preferably not more than 38% by weight. When the styrene content in SBR (1) is more than 50% by weight, generation of heat tends to be large.

A vinyl content in SBR (1) is not less than 30% by weight, and preferably not less than 32% by weight. When the vinyl content in SBR (1) is less than 30% by weight, grip performance is not sufficiently improved. The vinyl content in SBR (1) is preferably not more than 65% by weight, and more preferably not more than 60% by weight. When the vinyl content in SBR (1) is more than 65% by weight, abrasion resistance tends to be lowered.

SBR (1) may be used alone or at least two kinds thereof may be used in combination as long as the styrene content and the vinyl content are in the above-described ranges.

An amount of SBR (1) is not less than 15% by weight in the rubber component, and preferably not less than 30% by weight. When the amount of SBR (1) is less than 15% by weight, grip performance is not sufficiently improved. The amount of SBR (1) is preferably not more than 90% by weight, and more preferably not more than 60% by weight. When the amount of SBR (1) is more than 90% by weight, generation of heat tends to be large.

A styrene content in SBR (2) is preferably not less than 5% by weight, and more preferably not less than 8% by weight. When the styrene content in SBR (2) is less than 5% by weight, grip performance tends to be insufficient. The styrene content in SBR (2) is not more than 15% by weight, and preferably not more than 12% by weight. When the styrene content in SBR (2) is more than 15% by weight, not only rolling resistance is increased, but also performances on a snow and icy surface and crack resistance at a low temperature are lowered.

A vinyl content in SBR (2) is preferably not less than 20% by weight, more preferably not less than 30% by weight, and further more preferably not less than 40% by weight. When the vinyl content in SBR (2) is less than 20% by weight, grip performance tends to be insufficient. The vinyl content in SBR (2) is not more than 60% by weight, and preferably not more than 50% by weight. When the vinyl content in SBR (2) is more than 60% by weight, rolling resistance is increased.

SBR (2) may be used alone or at least two kinds thereof may be used in combination as long as the styrene content and the vinyl content are in the above-described ranges.

An amount of SBR (2) is not less than 10% by weight in the rubber component, and preferably not less than 15% by weight. When the amount of SBR (2) is less than 10% by weight, rolling resistance is increased. The amount of SBR (2) is preferably not more than 85% by weight, and more preferably not more than 50% by weight. When the amount of SBR (2) is more than 85% by weight, grip performance tends to be insufficient.

A total amount of SBR (1) and SBR (2) is not less than 60% by weight in the rubber component, and preferably not less than 70% by weight. When the total amount of SBR (1) and SBR (2) is less than 60% by weight, rolling resistance property and grip performance cannot be improved in favorable balance. The total amount of SBR (1) and SBR (2) is preferably not more than 100% by weight, more preferably not more than 90% by weight, and further more preferably not more than 80% by weight.

In addition to SBR (1) and SBR (2), other rubbers can be used; examples thereof are SBR other than SBR (1) and SBR (2), a natural rubber (NR), a butadiene rubber (BR), an isoprene rubber (IR), an acrylonitrile-butadiene rubber (NBR), a chloroprene rubber (CR), a butyl rubber (IIR) and a styrene-isoprene-butadiene rubber (SIBR), and among these rubbers other than SBR (1) and SBR (2), NR is preferable from the viewpoint that tensile strength is excellent.

Silica is not particularly limited, and those prepared with a wet process (silicic anhydride) or a dry process (silicic anhydride) can be used, and from the viewpoint of containing a large amount of silanol groups, silica prepared with a wet process is preferable.

A nitrogen adsorbing-specific surface area ($N_2SA$) of silica is not less than 20 $m^2/g$, preferably not less than 40 $m^2/g$, more preferably not less than 80 $m^2/g$, and further more preferably not less than 120 $m^2/g$, particularly preferably not less than 200 $m^2/g$, and most preferably not less than 250 $m^2/g$. When $N_2SA$ of silica is less than 20 $m^2/g$, abrasion resistance is lowered. $N_2SA$ of silica is not more than 500 $m^2/g$, preferably not more than 480 $m^2/g$, and more preferably not more than 450 $m^2/g$. When $N_2SA$ of silica is more than 500 $m^2/g$, not only generation of heat becomes large, but also processability in rubber kneading is lowered.

When silica is dispersed in water to obtain a 5%-aqueous dispersion, a pH (5% pH) of the obtained aqueous dispersion of the silica is preferably not less than 7, and more preferably not less than 7.2. When the 5% pH of silica is less than 7, a reaction speed with a silane coupling agent becomes slow, thereby, a kneading time tends to increase. The 5% pH of the silica is preferably not more than 12, and more preferably not more than 10. It tends to be difficult to prepare silica having a 5% pH of more than 12.

An amount of silica is not less than 15 parts by weight, and preferably not less than 40 parts by weight. When the amount of silica is less than 15 parts by weight, sufficient effects due to compounding silica cannot be obtained. The amount of silica is not more than 150 parts by weight, and preferably not more than 120 parts by weight. When the amount of silica is more than 150 parts by weight, dispersion of silica into a rubber becomes difficult, thus, processability of the rubber is deteriorated.

In the present invention, by comprising a specified amount of the rubber component containing specified amounts of SBR (1) and SBR (2), and a specified amount of silica, rolling resistance can be reduced without lowering wet grip performance.

In the present invention, a silane coupling agent as well as a silica can be used together.

A silane coupling agent preferably used in the present invention can be any silane coupling agent conventionally used together with silica, and examples thereof are
bis(3-triethoxysilylpropyl)polysulfide,
bis(2-triethoxysilylethyl)polysulfide,
bis(3-trimethoxysilylpropyl)polysulfide,
bis(2-trimethoxysilylethyl)polysulfide,
bis(4-triethoxysilylbutyl)polysulfide, and
bis(4-trimethoxysilylbutyl)polysulfide, and these silane coupling agents can be used alone or at least two kinds thereof may be used in combination.

When a silane coupling agent is used together with a silica, an amount of the silane coupling agent is preferably not less than 2 parts by weight on the basis of 100 parts by weight of the silica, and more preferably not less than 8 parts by weight. When the amount of the silane coupling agent is less than 2 parts by weight, improvement effects of abrasion resistance tend to be insufficient. The amount of the silane coupling agent is preferably not more than 20 parts by weight, and more preferably not more than 16 parts by weight. When the amount of the silane coupling agent is more than 20 parts by weight, improvement effects of physical properties tend to decrease.

In the rubber composition of the present invention, in addition to the above-described rubber component, silica and silane coupling agent, compounding agents generally used in rubber industries such as carbon black, a filler such as clay, various antioxidants, a process oil, a vulcanizing agent such as sulfur, stearic acid, wax and zinc oxide can be suitably compounded according to the necessity.

The rubber composition of the present invention is preferably to be a rubber composition for a tread from the viewpoint that rolling resistance property and grip performance can be improved in favorable balance.

A tire of the present invention is prepared by general processes, using the rubber composition of the present invention. Namely, the rubber composition of the present invention which is compounded with the above various chemicals according to the necessity is extrusion-processed by adjusting to a shape of each of tire parts in an unvulcanized step, and molded on a tire molding machine to form an unvulcanized tire. This unvulcanized tire is heated and pressurized in a vulcanizer to obtain the tire of the present invention.

EXAMPLES

The present invention is specifically explained based on Examples, but the present invention is not limited only thereto.

Various chemicals used in Examples and Comparative Examples are collectively explained in the following.

Styrene-butadiene rubber 1 (SBR 1): Tufdene 3335 (styrene content: 35% by weight, vinyl content: 33% by weight, oil content on the basis of 100 parts by weight of rubber solid content: 37.5 parts by weight) available from Asahi Kasei Chemicals Corporation Styrene-butadiene rubber 2 (SBR 2): polymerized styrene and 1,3-butadiene in a hydrocarbon solvent by using an alkyl lithium initiator (styrene content: 10% by weight, vinyl content: 45% by weight)

Styrene-butadiene rubber 3 (SBR 3): Tufdene 3330 (styrene content: 31% by weight, vinyl content: 33% by weight, oil content on the basis of 100 parts by weight of rubber solid content: 37.5 parts by weight) available from Asahi Kasei Chemicals Corporation Styrene-butadiene rubber 4 (SBR 4): NS 112R (styrene content: 15% by weight, vinyl content: 30% by weight) available from ZEON Corporation Natural Rubber (NR)
Silica: Carplex#67 ($N_2SA$: 429 $m^2/g$, 5% pH: 7.4) available from Degussa Co.
Silane coupling agent: Si75 (bis(3-triethoxysilylpropyl)disulfide) available from Degussa Co.
Aromatic oil: DIANAPROCESS AH-24 available from Idemitsu Kosan Co., Ltd.
Zinc oxide: available from Mitsui Mining & Smelting Co., Ltd.
Stearic acid: Stearic acid "Tsubaki" available from NOF Corporation
Antioxidant: ANTIGENE 6C (N-(1,3-dimethylbutyl-N'-phenyl-p-phenylenediamine)) available from Sumitomo Chemical Co., Ltd.
Wax: SANOC N available from Ouchi Shinko Chemical Industrial Co., Ltd.
Sulfur: Sulfur powder available from Karuizawa Iou Co., Ltd.
Vulcanization accelerator CZ: NOCCELER CZ (N-cyclohexyl-2-benzothiazolylsulfeneamide) available from Ouchi Shinko Chemical Industrial Co., Ltd.
Vulcanization accelerator DPG: NOCCELER D (1,3-diphenylguanidine) available from Ouchi Shinko Chemical Industrial Co., Ltd.

Examples 1 to 3 and Comparative Examples 1 to 4

According to compounding prescriptions of Table 1, chemicals other than sulfur and a vulcanization accelerator were kneaded for 4 minutes under a temperature at 150° C. to obtain a kneaded product, using a banbury mixer. Then, the above sulfur and vulcanization accelerator were added to the obtained kneaded product and kneaded for 3 minutes under a temperature at 80° C., using an open roll, to obtain an unvulcanized rubber composition. The obtained unvulcanized rubber composition was molded into a tread shape, and an unvulcanized tire was prepared by laminating with other tire parts and press-vulcanized to prepare tires for testing (tire size: 195/65R15) of Examples 1 to 3 and Comparative Examples 1 to 4.

(Rolling Resistance)

Rolling resistance was measured at running the test tire under the conditions of a rim of 15×6JJ, an inner pressure at 230 kPa, a lord of 3.43 kN, and a speed at 80 km/h by using a rolling resistance tester, and rolling resistance of each composition was expressed as an index from the following calculation formula, assuming the rolling resistance index of Comparative Example 1 as 100. The larger the rolling resistance index is, the more the rolling resistance is lowered, which indicates that fuel efficiency at a low cost is excellent.

(Rolling resistance index)=(Rolling resistance of Comparative Examples 1)÷(Rolling resistance of each composition)×100

(Wet Grip Performance)

The prepared tires for testing were mounted on all wheels of a test vehicle (domestic vehicle FF 2000 cc), and actual test driving in the test vehicle was carried out on a test course having a wet asphalt road surface. In this test running, the test vehicle was run at 100 km/h, and a breaking distance was measured from braking until the vehicle is stopped. Wet grip performance of each composition was expressed as an index by the following calculation formula, assuming the wet grip performance index of Comparative Example 1 as 100. The larger the wet grip performance index is, the more excellent wet grip performance is.

(Wet grip performance index)=(Braking distance of each composition)÷(Braking distance of Comparative Example 1)×100

Results of the above tests are shown in Table 1.

TABLE 1

|  | Ex. | | | Com. Ex. | | | |
|---|---|---|---|---|---|---|---|
|  | 1 | 2 | 3 | 1 | 2 | 3 | 4 |
| Amounts (part by weight) | | | | | | | |
| SBR 1 | 68.75 | 55 | 55 | 96.25 | — | 75.625 | — |
| SBR 2 | 20 | 30 | — | — | 70 | — | 55 |
| SBR 3 | — | — | — | — | — | 61.875 | 61.875 |
| SBR 4 | — | — | 30 | — | — | — | — |
| NR | 30 | 30 | 30 | 30 | 30 | — | — |
| Silica | 80 | 80 | 80 | 80 | 80 | 80 | 80 |
| Silane coupling agent | 8 | 8 | 8 | 8 | 8 | 8 | 8 |
| Aromatic oil | 18.75 | 22.5 | 22.5 | 11.25 | 37.5 | — | 20.625 |
| Zinc oxide | 3 | 3 | 3 | 3 | 3 | 3 | 3 |
| Stearic acid | 2 | 2 | 2 | 2 | 2 | 2 | 2 |
| Antioxidant | 2 | 2 | 2 | 2 | 2 | 2 | 2 |
| Wax | 2 | 2 | 2 | 2 | 2 | 2 | 2 |
| Sulfur | 2 | 2 | 2 | 2 | 2 | 2 | 2 |
| Vulcanization accelerator CZ | 1.8 | 1.8 | 1.8 | 1.8 | 1.8 | 1.8 | 1.8 |
| Vulcanization accelerator DPG | 2 | 2 | 2 | 2 | 2 | 2 | 2 |
| Evaluation results | | | | | | | |
| Rolling resistance index | 104 | 107 | 106 | 100 | 111 | 105 | 108 |
| Wet grip performance index | 99 | 97 | 97 | 100 | 81 | 95 | 90 |

According to the present invention, there can be provided a rubber composition which comprises a specific silica in a specified amount and a rubber component comprising respectively specified amounts of two or more kinds of styrene-butadiene rubbers having different styrene contents and different vinyl contents and enables rolling resistance to be reduced without lowering wet grip performance.

What is claimed is:

1. A rubber composition comprising a rubber component and a silica having a nitrogen adsorbing-specific surface area of 20 to 500 $m^2/g$ and present in an amount of 15 to 150 parts by weight on the basis of 100 parts by weight of the rubber component, said rubber component comprising;
   not less than 15% by weight of a styrene-butadiene rubber (1) having a styrene content of not less than 33% by weight and a vinyl content of not less than 30% by weight,
   not less than 10% by weight of a styrene-butadiene rubber (2) having a styrene content of not more than 15% by weight and a vinyl content of not more than 60% by weight,
   wherein a total content of said styrene-butadiene rubber (1) and said styrene-butadiene rubber (2) is not less than 60% by weight of said rubber component.

2. The rubber composition of claim 1, wherein the silica is dispersed in water to be a 5%-aqueous dispersion, a pH of the aqueous dispersion of said silica being 7 to 12.

3. The rubber composition of claim 1, where styrene-butadiene rubber (1) has a styrene content of 33 to 50% by weight and a vinyl content of 30 to 65% by weight.

4. The rubber composition of claim 1, wherein styrene-butadiene rubber (2) has a styrene content of 5 to 15% by weight and a vinyl content of 20 to 60% by weight.

5. The rubber composition of claim 1, wherein styrene-butadiene rubber (1) is present in an amount of 15 to 90% by weight and styrene-butadiene rubber (2) is present in an amount of 10 to 85% by weight.

6. The rubber composition of claim 1, wherein styrene-butadiene rubber (1) and styrene-butadiene rubber (2) are present in the rubber composition in an amount of 60 to 100% by weight.

7. A tire, which comprises the rubber composition of claim 1.

* * * * *